United States Patent Office 3,425,826
Patented Feb. 4, 1969

3,425,826
PURIFICATION OF VANADIUM AND
COLUMBIUM (NIOBIUM)
Frederick A. Schmidt and Oscar N. Carlson, Ames, Iowa, William E. Krupp, Simi, Calif., and Harley A. Wilhelm, Ames, Iowa, assignors to the United States of America as represented by the United States Atomic Energy Commission
No Drawing. Filed Mar. 21, 1966, Ser. No. 537,619
U.S. Cl. 75—84                                    6 Claims
Int. Cl. C22d 7/04; C22b 51/00, 55/00

ABSTRACT OF THE DISCLOSURE

Vanadium or columbian (niobium) which has been prepared by the aluminothermic reduction of the oxide is purified by heating at a temperature close to but below its melting point at a pressure of not more than $10^{-4}$ torr. The purified metal is then melted and cast in the absence of reactive gases. Carrying out the melting by an electron beam under high vacuum produces a further purification.

CONTRACTUAL ORIGIN OF THE INVENTION

The invention described herein was made in the course of or under a contract with the United States Atomic Energy Commission.

BACKGROUND

Vanadium and columbium (niobium) are useful in the nuclear energy field because of their high melting points, low neutron capture cross sections, and resistance to certain types of corrosion. The two metals have been used in combination in the cladding of the fuel elements of certain fast reactors. Vanadium-columbium alloys are of considerable value because of their high temperature strength and their creep resistance combined with high oxidation resistance when coated with silicon.

Columbium has also been used as the metallic component of nuclear fuels of the cermet type which are formed from mixtures of metal powder and uranium dioxide or plutonium dioxide, the mixture being consolidated by the impact of a rapidly moving heavy ram.

The columbium-zirconium and columbium-tin alloys are valuable in the preparation of superconducting wires.

These and other applications of vanadium and columbium require very pure material.

The alumino-thermic reduction of the pentoxides, $V_2O_5$ and $Nb_2O_5$ is an economical means of producing the metals, but the latter contain excessive quantities of impurities, particularly aluminum and oxygen. Excessive iron may also be present.

SUMMARY OF THE INVENTION

Our process comprises heating the metal still containing some aluminum, in a granular condition to a temperature close to but below its melting point, under extremely high vacuum. The pressure should not exceed $10^{-4}$ torr. Under these conditions the aluminum is vaporized and the oxygen is also removed. If iron is present, as is frequently the case, it is also vaporized. Vanadium and columbium have been obtained in purities in excess of 99.9%. The overall recovery of metal in the process including the reduction and purification steps is at least 85 to 90%.

Vanadium and columbium are not completely equivalent in this process. In the reduction step vanadium cannot be obtained with less than about 11% aluminum content without also containing an excessive amount of oxygen. Columbium on the other hand can be reduced by aluminum to a satisfactorily low oxygen content and still contain only about 2% aluminum. These differences together with the differences in the melting points of the metal and the vapor pressures at the melting points, cause differences in their behavior. For example, we have found it possible to purify columbium by carrying out two successive very high vacuum melting operations after the reduction and without the solid-state heating which characterizes our process. This cannot be done with vanadium, because its high vapor pressure at its melting point, together with the "carrier" effect of the relatively large amount of aluminum vapor produced and the relatively long heating time required to remove the aluminum and oxygen, cause an unacceptable loss of vanadium.

Our process is however very advantageous as applied to columbium since the dealuminization step makes it possible to melt the columbium by the relatively inexpensive inert-gas-shielded arc method and still obtain satisfactory metal.

The vanadium or columbium produced by our process is highly ductile and is readily formed into the thin sheets or wires required for many applications.

DETAILED DESCRIPTION

The following examples show specific applications of our processes.

Example I

VANADIUM

Vanadium pentoxide of approximately 99.8% purity was employed. Ingots of high purity aluminum were milled into particles approximately $\frac{1}{4}''$ x $\frac{1}{8}''$ x $\frac{1}{32}''$. The reduction was carried out in a steel bomb lined with aluminum trioxide. The bomb was first flushed with a stream of argon to reduce the contamination of the metal by nitrogen from the air. A small quantity of $V_2O_5$ and aluminum powder was first placed in the bottom of the bomb to serve as the igniter. A mixture of 0.49% kg. of the milled aluminum and 0.9% kg. of $V_2O_5$ was then added. The bomb was heated until the exothermic reaction had begun. This takes place at approximately 750° C. When the reaction was completed, as shown by the temperature curve, the crucible was cooled to ambient temperature.

The alloy product weighing substantially 0.5 kg. was leached in dilute $HNO_3$ and crushed into pieces less than $\frac{1}{4}''$ in diameter. This is readily accomplished by an ordinary jaw crusher, the alloy being quite brittle. The crushed alloy was then placed in a tantalum crucible inside a high vacuum induction furnace. This furnace consisted of a quartz tube containing a tantalum metal heater wrapped with graphite felt insulation. The vanadium was heated to 1700° C. and held at this temperature for eight hours under a pressure of $5 \times 10^{-5}$ torr. The temperature must be controlled rather carefully. While the melting point of vanadium is 1890° C., the vanadium-tantalum system exhibits a minimum in the solidus at 1820° C.

The aluminum and other condensible impurities are collected on the side wall of the quartz tube.

The vanadium sponge which is produced by the solid state heating step was then purified by melting at a pressure of about $2\times10^{-6}$ torr in an electron beam furnace. The composition of the metal at the successive processing stages is shown in Table I.

TABLE I.—ANALYSIS OF VANADIUM METAL AT VARIOUS PROCESSING STAGES

| Element | Impurity content in weight percent | | |
|---|---|---|---|
| | Bomb reduced alloy | Metal sponge | Electron beam melted ingot |
| Al | 11.10 | 1.42 | 0.010 |
| C | 0.013 | | 0.015 |
| Cr | <0.008 | <0.008 | <0.008 |
| Cu | <0.010 | <0.010 | <0.002 |
| Fe | 0.081 | 0.035 | 0.012 |
| Ni | 0.002 | 0.002 | 0.002 |
| N* | 0.006 | 0.008 | 0.008 |
| O* | 0.290 | 0.010 | 0.005 |
| Si | ~0.050 | ~0.050 | ~0.050 |

*Values determined by vacuum fusion analysis.

The metal obtained by this method exhibits excellent ductility, a reduction in cross sectional area greater than 99% being achieved by cold rolling. The hardness is between 85 and 100 DPH.

Direct electron beam melting of the bomb reduced regulus was attempted in an effort to eliminate the dealuminization step. This effort was, however, unsuccessful, since, as stated above, excessive amounts of vanadium are lost when the heating in the molten condition is continued sufficiently long to eliminate the aluminum and oxygen.

Example II

COLUMBIUM

Technical grade $Nb_2O_5$ was used as the reactant compound. The reduction was carried out in a steel bomb lined with aluminum trioxide. The aluminum used was commercial aluminum pigment. This powder was 100% minus 40 mesh and 40% minus 325 mesh. The $Nb_2O_5$ and aluminum powder were charged into the lined crucible and covered by $Al_2O_3$. The lid was then put on and the reaction initiated by placing the charged bomb in a gas furnace preheated to 800° C. and the temperature of the furnace was increased to 1000° C. When the outside of the bomb reached approximately 1000° C. the charge ignited and the exothermic reaction rapidly increased the temperature of the bomb wall to approximately 1075° C. The temperature inside the bomb was sufficient to obtain liquid slag and metal phases. A typical charge consisted of 1596 g. $Nb_2O$- and 570 g. of the aluminum pigment reductant. The massive columbium metal was collected as a "biscuit" at the bottom of the lined crucible. These biscuits contained approximately 2 wt. percent aluminum and 0.8 wt. percent oxygen as major impurities.

The columbium alloy prepared in this manner was quite brittle and as a result it was easily crushed into pieces of minus 4 mesh plus 60 mesh by processing through a jaw-crusher.

The crushed columbium was placed in a tantalum crucible which was in turn placed inside a vacuum induction furnace. The furnace consisted of a quartz tube containing a tantalum metal heater wrapped with graphite felt insulation. The temperatures were measured with an optical pyrometer sighted on the surface of the columbium. The pressure was maintained at $5\times10^{-5}$ torr except at the onset of the heating cycle when a slight pressure increase occurred. The condensable impurities were collected on the side wall of the quartz tube where they were easily removed. The heating was continued for a total of eight hours. The different batches of columbium were heated at temperatures of 1800°, 2000° and 2200° C. The 2000° C. heating was found to be the optimum. The heating at 1800° C. does not produce quite as much removal of impurities as is desired while the heating at 2200° C. causes a somewhat excessive loss of columbium.

The columbium sponge obtained by the heating step just described was subsequently consolidated into massive metal by inert-gas-shielded arc or electron beam melting. The arc melted specimens were sectioned and pieces ¼″ thick cold rolled at room temperature. It was found that arc melted specimens derived from the sponge that had been prepared by preheating to only 1800° C. cracked severely after only a few percent reduction in cross-section. The specimens prepared from the 2000 and 2200° C. sponges were of sufficient purity that reduction in cross section areas of 95–97% were obtained by cold rolling. The arc melted sections of sponge heated at 1800, 2000 and 2200° C. had CPH numbers of 385, 128 and 118 respectively.

Other samples were subjected to electron beam melting at a pressure of about $2\times10^{-6}$ torr. This treatment greatly decreased the aluminum and oxygen in the sponge heated to only 1800° C. and as a result all specimens were cold rolled directly to sheet 6 to 8 mils thick. The DPH numbers of the electron beam-melted sample varied from 57 to 67. Chemical analysis of the bomb-reduced columbium, the sponge heated to 200° C., and the arc melted and the electron beam melted portions are shown in Table II.

TABLE II

| Element | Impurity content in weight percent | | | |
|---|---|---|---|---|
| | Bomb-reduced | Metal sponge | Arc-melted sponge | Electron beam-melted sponge |
| Al | 2.20 | 0.120 | 0.120 | <0.002 |
| C | 0.025 | 0.008 | 0.008 | 0.008 |
| Fe | 0.10 | 0.010 | 0.010 | 0.005 |
| H | 0.006 | <0.0005 | <0.0005 | <0.0005 |
| N | 0.035 | 0.004 | 0.005 | 0.005 |
| O | 0.78 | <0.010 | <0.010 | <<0.010 |

It will be noted that relatively little removal of the impurities was accomplished by the arc melting, although as noted above the dealuminization step without additional purification produced a sufficient ductile metal for many uses. The electron beam heating reduced the aluminum and oxygen contents to very low values.

In the arc melting step referred to above a laboratory furnace similar to that described by Hurford in U.S. AEC report TID–5061 was used. This unit was provided with a water cooled tungsten tip which served as the electrode and the molten metal was contained in a water-cooled button mold. All melts were made under an argon pressure of about 500 torr. This equipment is considerably cheaper than an electron beam furnace.

Experiments were continued in which an attempt was made to remove the aluminum, oxygen and nitrogen from the columbium by a single electron beam melt. However, the large amount of aluminum and oxygen removed by volatization caused considerable interference with the melting operation, though the effect was not as severe as with the vanadium for the reasons mentioned above.

The large decrease in the oxygen content accompanying the dealuminization was unexpected, since most of the oxygen appears to be in the form of the highly refractory $Al_2O_3$, inclusions of which were found in the bomb-reduced regulus by microscopic examination. They were replaced by voids after the dealuminization step. It is postulated, therefore, that under the dealuminization conditions the oxidation-reduction reaction is reversed and $Al_2O_3$ is reduced by the metal to yield aluminum vapor and a volatile form of vanadium oxide or niobium oxide.

While we have described all the embodiments of our inventions in detail it will be understood that various modifications are possible. We, therefore, wish our invention to be limited solely by the scope of the appended claims.

The embodiments of the invention in which an exclusive right or privilege is claimed are defined as follows:

1. In a method of producing a metal selected from the group consisting of vanadium and columbium (niobium) by the aluminothermic reduction of the pentoxide of said metal, the improvement comprising purifying said metal by the steps of—

(a) heating the metal produced by said reduction at a temperature near but below its melting point at a pressure not exceeding $10^{-4}$ torr for several hours and then—
(b) melting and casting said metal in the absence of reactive gases.

2. A process as defined in claim 1, wherein the metal is vanadium, the temperature and pressure in step (a) are 1700° C. and $5 \times 10^{-5}$ torr, respectively, and the melting in step (b) is by an electron beam under high vacuum.

3. A process as defined in claim 1 wherein the metal is columbium (niobium) and the temperature and pressure in step (a) are 1800° C.–2200° C., and $10^{-5}$ torr respectively.

4. A process as defined in claim 3, wherein the temperature in step (a) is 2000° C.

5. A process as defined in claim 3, wherein the temperature in step (a) is 2000° C.–2200° C. and the melting in step (b) is carried out by an electric arc in an inert atmosphere.

6. A process as defined in claim 3 wherein the melting in step (b) is carried out by an electron beam under high vacuum.

References Cited
UNITED STATES PATENTS

| | | | |
|---|---|---|---|
| 2,789,896 | 4/1957 | Coffer | 75—84 X |
| 3,072,982 | 1/1963 | Gordon et al. | 75—10 X |
| 3,078,326 | 2/1963 | Smith | 75—10 X |
| 3,184,302 | 5/1965 | Chindgren | 75—84 |
| 3,218,154 | 11/1965 | Sell et al. | 75—10 |
| 3,226,223 | 12/1965 | Bussard et al. | 75—10 |

CARL D. QUARFORTH, *Primary Examiner.*

M. J. SCOLNICK, *Assistant Examiner.*

U.S. Cl. X.R.

75—10, 27